US011777879B2

(12) United States Patent
Errore et al.

(10) Patent No.: US 11,777,879 B2
(45) Date of Patent: Oct. 3, 2023

(54) AGGREGATION OF WIDELY SPREAD RESPONSES

(71) Applicant: International Business Machines Corporation, Armonk, NY (US)

(72) Inventors: Stefania Errore, Rome (IT); Daniela Pellegrino, Rome (IT); Cristiano Colantuono, Rome (IT); Angelina Ascone, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 16/551,178

(22) Filed: Aug. 26, 2019

(65) Prior Publication Data
US 2021/0067474 A1    Mar. 4, 2021

(51) Int. Cl.
*H04L 51/046*  (2022.01)
*H04L 51/42*   (2022.01)
*H04L 51/222*  (2022.01)

(52) U.S. Cl.
CPC .......... *H04L 51/046* (2013.01); *H04L 51/222* (2022.05); *H04L 51/42* (2022.05)

(58) Field of Classification Search
CPC ........ H04L 51/046; H04L 51/20; H04L 51/22
See application file for complete search history.

(56) References Cited

U.S. PATENT DOCUMENTS

| 6,480,885 B1* | 11/2002 | Olivier ...................... H04L 9/40 709/202 |
| 9,342,705 B1* | 5/2016 | Schneider ............. H04L 9/0822 |
| 2002/0072966 A1* | 6/2002 | Eldering ................ H04N 7/165 348/E7.063 |
| 2003/0217109 A1* | 11/2003 | Ordille ................... G06Q 10/00 709/206 |
| 2004/0010520 A1* | 1/2004 | Tsang ................... H04L 67/2814 |
| 2008/0133671 A1* | 6/2008 | Kalaboukis ............. H04L 51/00 709/206 |
| 2011/0016179 A1* | 1/2011 | Bechtel .................. G06Q 10/10 715/753 |
| 2011/0195696 A1* | 8/2011 | Fogel ..................... H04L 51/38 455/414.1 |
| 2011/0213846 A1* | 9/2011 | Sarin ..................... H04L 51/04 709/206 |

(Continued)

OTHER PUBLICATIONS

Resnick, P. (Ed.), "Internet Message Format," Network Working Group Request for Comments: 2822, Apr. 2001, 47 pages, https://www.ietf.org/rfc/rfc2822.txt.

(Continued)

*Primary Examiner* — Oleg Survillo
*Assistant Examiner* — Monishwar Mohan
(74) *Attorney, Agent, or Firm* — Mark Bergner

(57) ABSTRACT

A computer-implemented system and method aggregate electronic response messages. A communication server receives a request message from a sender addressed to a plurality of users. The request message contains within it an aggregation indicator indicating that responses to the request message are to be aggregated. A response address is modified within the request message directing a response message from a user to go to a message aggregation server, and the modified message is sent to each of the plurality of users.

19 Claims, 8 Drawing Sheets

(56) References Cited

U.S. PATENT DOCUMENTS

| | | | | |
|---|---|---|---|---|
| 2012/0185797 | A1* | 7/2012 | Thorsen | G06F 16/287 |
| | | | | 715/792 |
| 2013/0013707 | A1* | 1/2013 | Ku | H04L 12/1831 |
| | | | | 709/206 |
| 2013/0339387 | A1* | 12/2013 | Duong | G06F 16/9537 |
| | | | | 707/E17.014 |
| 2014/0358905 | A1* | 12/2014 | Stevens | G06F 16/9038 |
| | | | | 707/723 |
| 2014/0379818 | A1* | 12/2014 | Cudak | H04L 51/216 |
| | | | | 709/206 |
| 2016/0014151 | A1* | 1/2016 | Prakash | H04L 47/62 |
| | | | | 726/22 |
| 2018/0262905 | A1* | 9/2018 | Dhanapal | H04W 8/24 |
| 2021/0051002 | A1* | 2/2021 | Cheng | H04L 9/0819 |

OTHER PUBLICATIONS

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

\* cited by examiner

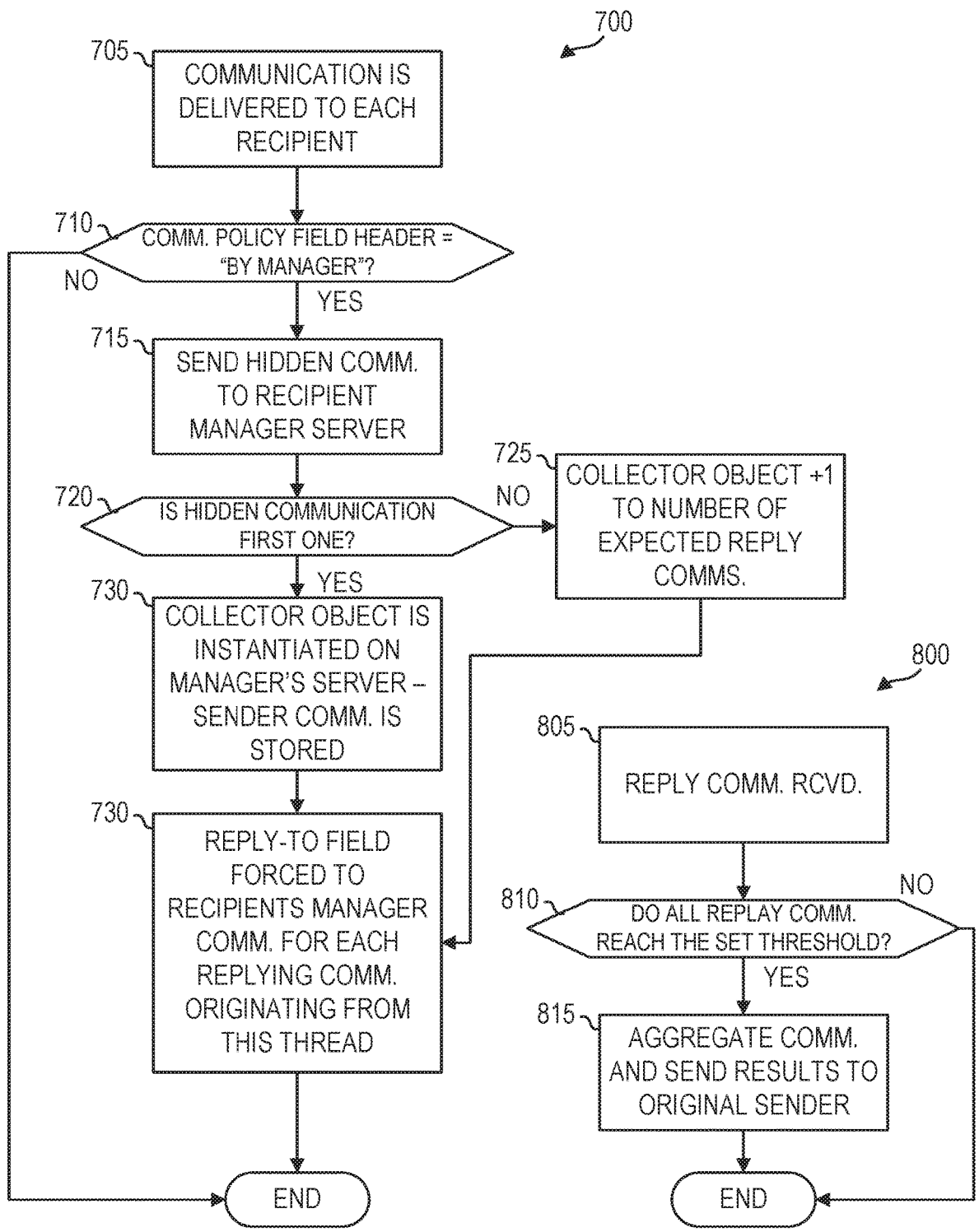

AGGREGATION OF WIDELY SPREAD RESPONSES

BACKGROUND

Disclosed herein is a system and related method for aggregating electronic response messages.

In certain situations, a message is sent that solicits responses from a large number of users. An example of this relates to computer security, where a message related to a product fix is sent to a large number of computer users and a response is solicited relating to whether the product fix has been implemented or not. However, receiving a large number of direct responses from all of the recipients may result in inefficiency in managing the responses. In these situations, it is desirable to improve the technical efficiency in collecting and aggregating responses from a plurality of target recipients

SUMMARY

According to aspects disclosed herein, a computer-implemented method for aggregating electronic response messages may be provided. The method may comprise, using a processor of a communication server, receiving a request message from a sender addressed to a plurality of users, the request message containing within the request message an aggregation indicator indicating that responses to the request message are to be aggregated, modifying a response address within the request message directing a response message from a user to go to a message aggregation server, thereby producing a modified message, and sending the modified message to each of the plurality of users.

According to other aspects disclosed herein, a communication server in an aggregated messaging system is provided. The system may comprise a processor configured to receive a request message from a sender addressed to a plurality of users, the request message containing within the request message an aggregation indicator indicating that responses to the request message are to be aggregated, modify a response address within the request message directing a response message from a user to go to a message aggregation server, thereby producing a modified message, send the modified message to each of the plurality of users.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings:

FIG. 7 is a flowchart illustrating a manager policy aggregation flow using hidden communications, according to some embodiments.

FIG. 8 is a flowchart illustrating the actual aggregation for a manager policy, according to some embodiments.

DETAILED DESCRIPTION

Figure 1:
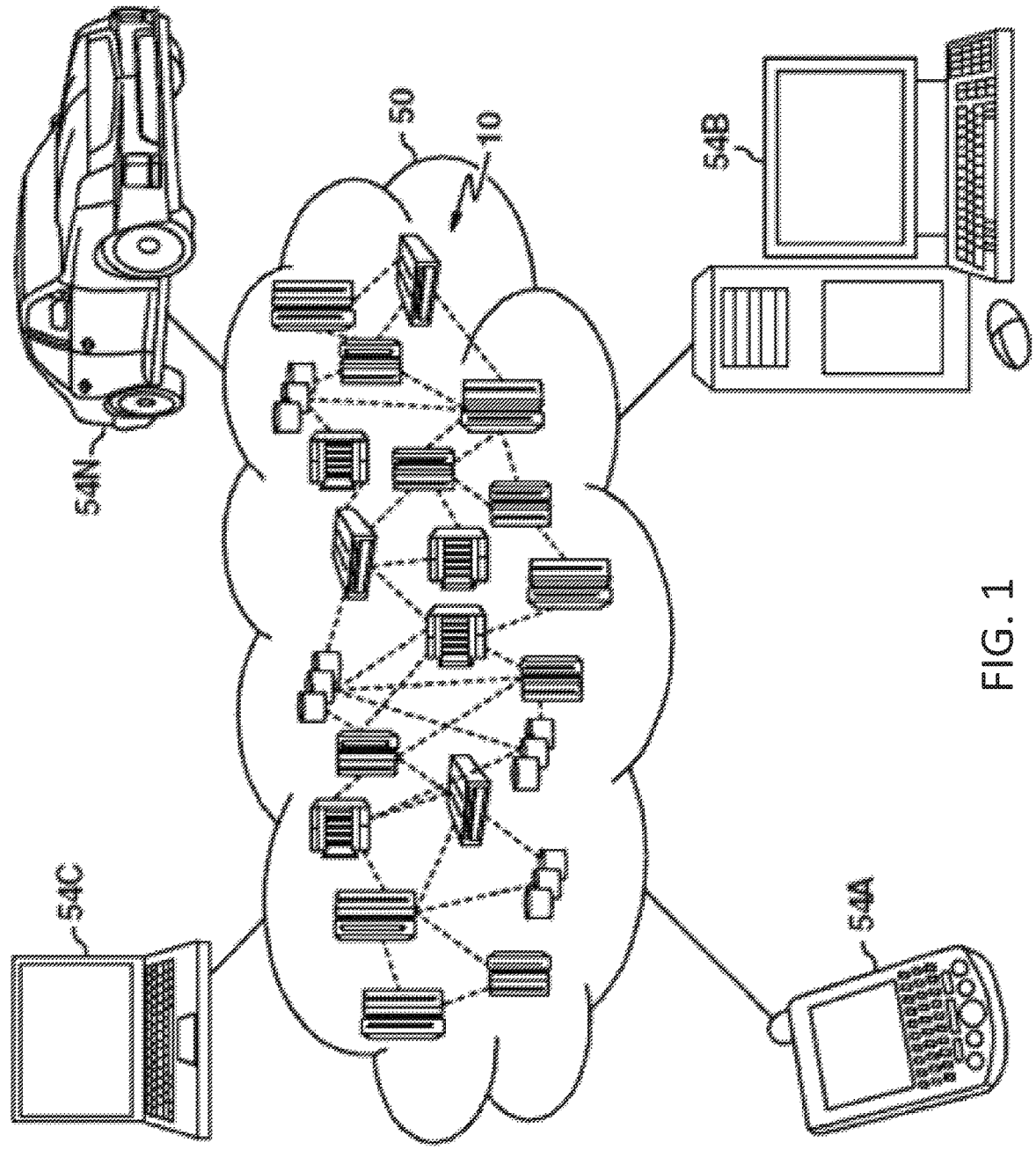
FIG. 1 depicts a cloud computing environment according to an embodiment of the present invention.

In order to allow efficient aggregation of responses to a request message, such as a message soliciting action for a computer or network security-related issue, it may be beneficial to allow the sender of a message indicate that an aggregated response is desired and for that indication to be contained within the message itself. Such aggregation is particularly desirable when large numbers of recipients are involved. The message may be in the form of a mail message, chat (e.g., IRC), instant message, or any other form of electronic communication.

A special handler may be added to the message server that looks for the aggregation indicator in the message, and, when found, alters the message prior to sending it on to the designated recipients. The alteration may modify the message and direct, e.g., by modifying a reply-to field, the response to go to a particular message aggregation server, which may instantiate an aggregator for a particular communication thread and collect the responses. Based on an aggregation rule, the responses may be parsed and a summary created based on the aggregated responses. Such an aggregated response summary may be sent to the original sender of the request message, thereby reducing a significant amount of work and communications on the part of the sender.

The following acronyms may be used below:
API application program interface
ARM advanced RISC machine
CD-ROM compact disc ROM
CMS content management system
CoD capacity on demand
CPU central processing unit
CUoD capacity upgrade on demand
DPS data processing system
DVD digital versatile disk EPROM erasable programmable read-only memory
FPGA field-programmable gate arrays
HA high availability
IaaS infrastructure as a service
I/O input/output
IPL initial program load
ISP Internet service provider
ISA instruction-set-architecture
LAN local-area network
LPAR logical partition
LTA logging/tracking/audit
PaaS platform as a service
PDA personal digital assistant
PLA programmable logic arrays
RAM random access memory
RISC reduced instruction set computer
ROM read-only memory
SaaS software as a service
SLA service level agreement
SOI search optimization service
SRAM static random access memory
WAN wide-area network Cloud Computing It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
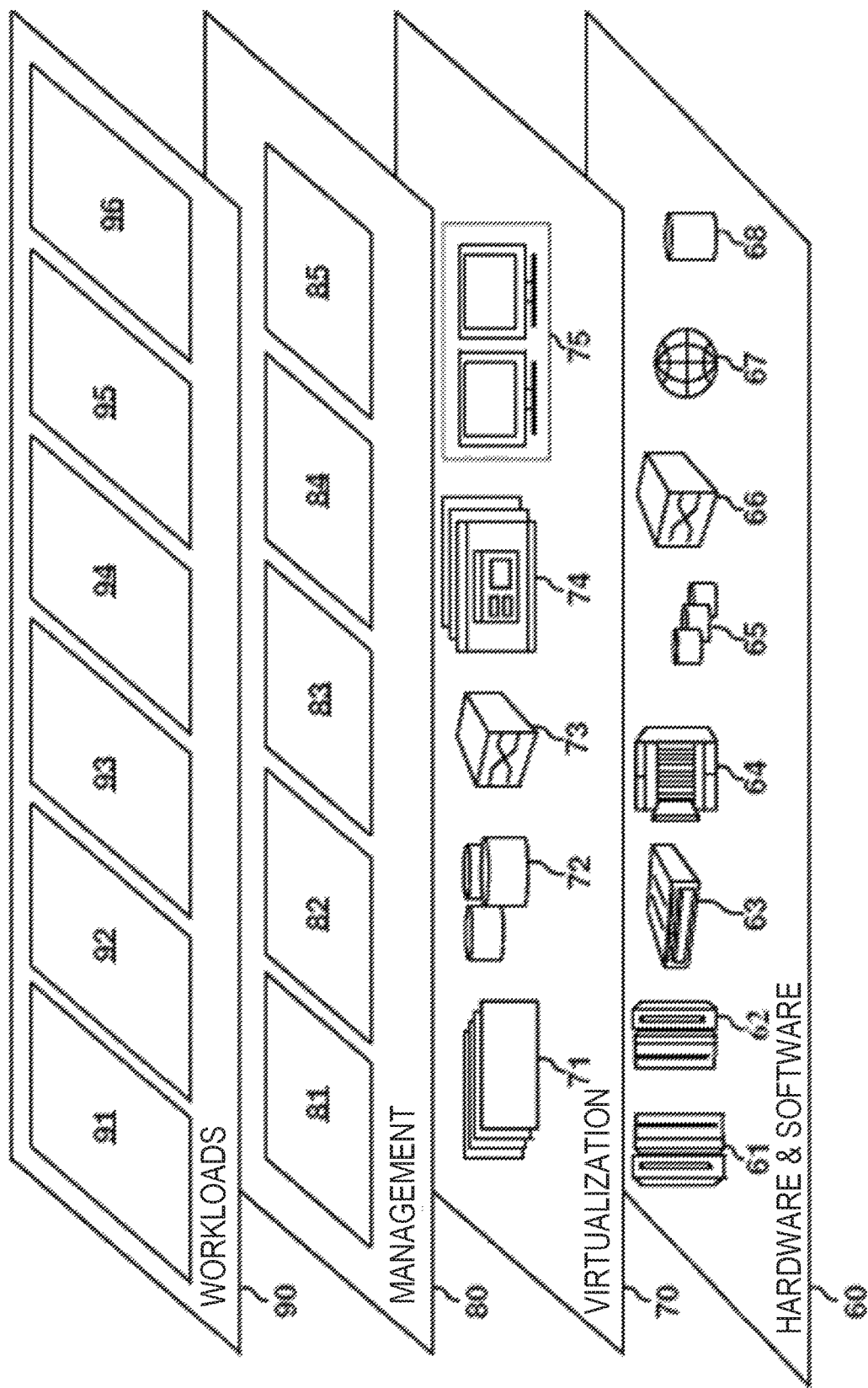
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Data Processing System

Figure 3:
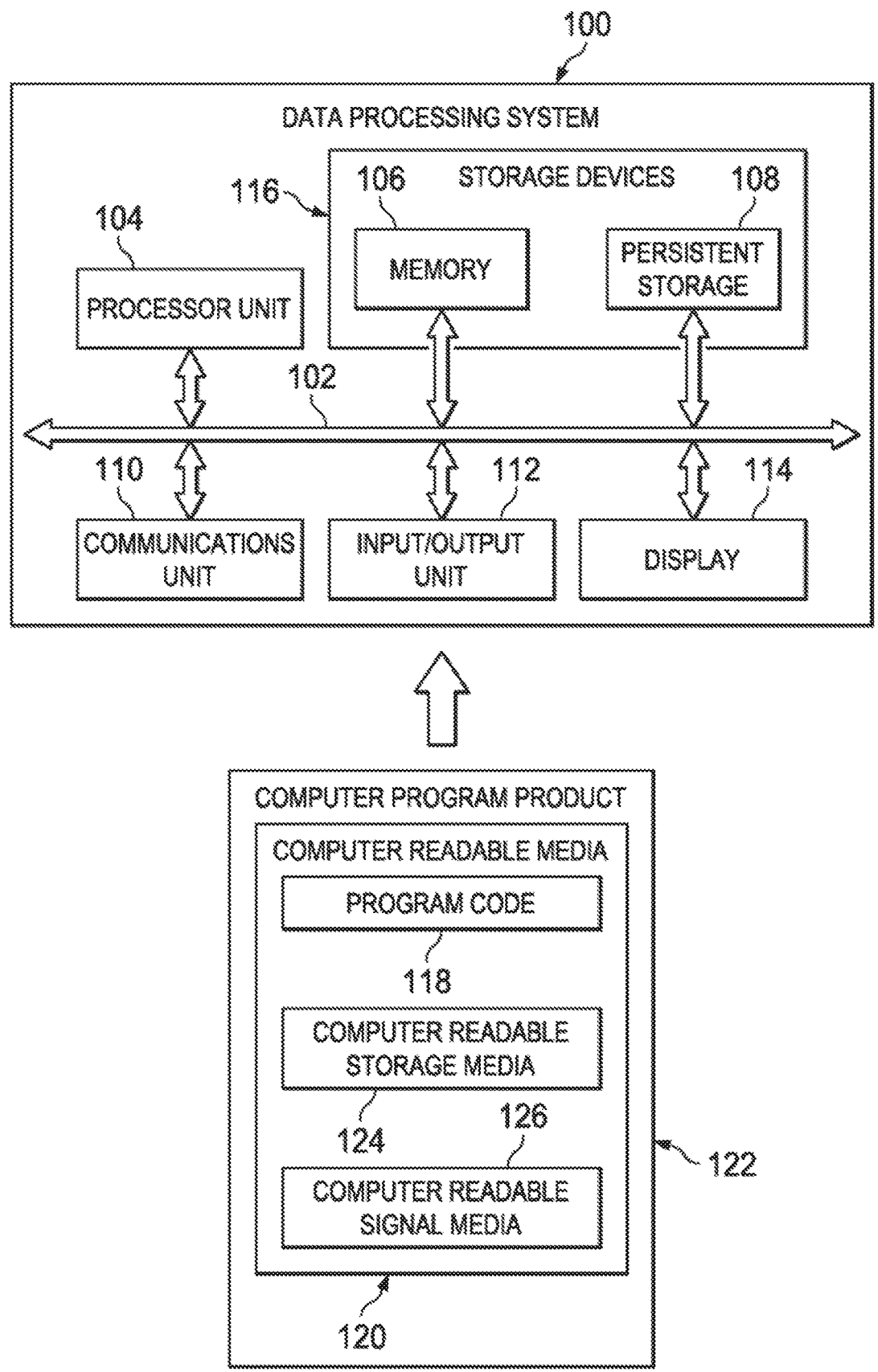
FIG. 3 is a block diagram of a DPS according to one or more embodiments disclosed herein.

FIG. 3 is a block diagram of an example DPS according to one or more embodiments. The DPS may be used as a cloud computing node 10. In this illustrative example, the DPS 100 may include communications bus 102, which may provide communications between a processor unit 104, a memory 106, persistent storage 108, a communications unit 110, an I/O unit 112, and a display 114.

The processor unit 104 serves to execute instructions for software that may be loaded into the memory 106. The processor unit 104 may be a number of processors, a multi-core processor, or some other type of processor, depending on the particular implementation. A number, as used herein with reference to an item, means one or more items. Further, the processor unit 104 may be implemented using a number of heterogeneous processor systems in which a main processor is present with secondary processors on a single chip. As another illustrative example, the processor unit 104 may be a symmetric multi-processor system containing multiple processors of the same type.

The memory 106 and persistent storage 108 are examples of storage devices 116. A storage device may be any piece of hardware that is capable of storing information, such as, for example without limitation, data, program code in functional form, and/or other suitable information either on a temporary basis and/or a permanent basis. The memory 106, in these examples, may be, for example, a random access memory or any other suitable volatile or non-volatile storage device. The persistent storage 108 may take various forms depending on the particular implementation.

For example, the persistent storage 108 may contain one or more components or devices. For example, the persistent storage 108 may be a hard drive, a flash memory, a rewritable optical disk, a rewritable magnetic tape, or some combination of the above. The media used by the persistent storage 108 also may be removable. For example, a removable hard drive may be used for the persistent storage 108.

The communications unit 110 in these examples may provide for communications with other DPSs or devices. In these examples, the communications unit 110 is a network interface card. The communications unit 110 may provide communications through the use of either or both physical and wireless communications links.

The input/output unit 112 may allow for input and output of data with other devices that may be connected to the DPS 100. For example, the input/output unit 112 may provide a connection for user input through a keyboard, a mouse, and/or some other suitable input device. Further, the input/output unit 112 may send output to a printer. The display 114 may provide a mechanism to display information to a user.

Instructions for the operating system, applications and/or programs may be located in the storage devices 116, which are in communication with the processor unit 104 through the communications bus 102. In these illustrative examples, the instructions are in a functional form on the persistent storage 108. These instructions may be loaded into the memory 106 for execution by the processor unit 104. The processes of the different embodiments may be performed by the processor unit 104 using computer implemented instructions, which may be located in a memory, such as the memory 106.

These instructions are referred to as program code, computer usable program code, or computer readable program code that may be read and executed by a processor in the processor unit 104. The program code in the different embodiments may be embodied on different physical or tangible computer readable media, such as the memory 106 or the persistent storage 108.

The program code 118 may be located in a functional form on the computer readable media 120 that is selectively removable and may be loaded onto or transferred to the DPS 100 for execution by the processor unit 104. The program code 118 and computer readable media 120 may form a computer program product 122 in these examples. In one example, the computer readable media 120 may be computer readable storage media 124 or computer readable signal media 126. Computer readable storage media 124 may include, for example, an optical or magnetic disk that is inserted or placed into a drive or other device that is part of the persistent storage 108 for transfer onto a storage device, such as a hard drive, that is part of the persistent storage 108. The computer readable storage media 124 also may take the form of a persistent storage, such as a hard drive, a thumb drive, or a flash memory, that is connected to the DPS 100. In some instances, the computer readable storage media 124 may not be removable from the DPS 100.

Alternatively, the program code 118 may be transferred to the DPS 100 using the computer readable signal media 126. The computer readable signal media 126 may be, for example, a propagated data signal containing the program code 118. For example, the computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 118 may be downloaded over a network to the persistent storage 108 from another device or DPS through the computer readable signal media 126 for use within the DPS 100. For instance, program code stored in a computer readable storage medium in a server DPS may be downloaded over a network from the server to the DPS 100. The DPS providing the program code 118 may be a server computer, a client computer, or some other device capable of storing and transmitting the program code 118.

The different components illustrated for the DPS 100 are not meant to provide architectural limitations to the manner in which different embodiments may be implemented. The different illustrative embodiments may be implemented in a DPS including components in addition to or in place of those illustrated for the DPS 100. Other components shown in FIG. 1 may be varied from the illustrative examples shown.

Machine Learning

Certain aspects described below may make use of machine learning, artificial intelligence, deep learning, neural networks, and the like. Machine learning algorithms may include, but not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms may utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, mayonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The output of machine learning algorithms may include one or more of, a predicted period of usage (e.g., a predicted expiration), a predicted area of usage (e.g., a predicted geofence), a predicted amount of usage (e.g., a predicted network speed, download volume, upload volume, etc.), a predicted type of usage (e.g., email, streaming, web browsing, application usage, rate of data upload/download, etc.), and/or other predictions.

Aggregation of Responses

Managing information related to certain issues, such as computer security issues, requires managing information received from different information sources, in different formats, and with varying frequency. In some instances, where this information requires action (e.g., a patch to software and the like), a severity level may be associated with the information. Information sources may include knowledge bases, product information, forums, external web sites, incident reports, e-mail, and the like. Additionally, the information sources may provide information in a structured or unstructured format, and may include, e.g., data coming from databases, email, and/or web-site pages. How this information is handled may be based on various factors. Important factors for consideration in security issues may include the severity of the incident, its business impact, and the role of the requester for action related to the security incident.

Security-related issues may be overseen by a Security Rep. A Security Rep's responsibilities may include: 1) receiving a security incident alert from a Sender; 2) understanding the content for the incident alert, and then performing the right actions according the company policies for managing the specific incident; 3) looking for the people in her/his team organization to determine if they are affected by the incident; 4) sending a Request to her/his contact list to check the impact on the specific component in their solution, where each team focal point checks the incident against company product policy, history, and current data, and Responds to the Request as to whether or not their solution/products are affected by the incident and the reason why or why not: a) in case they are affected, they need to apply a recommended action in the required time to solve the problem, and communicate their action plan in a Response back to the Requestor; b) in case they are not impacted, they will send a Response that may be in the form of a simple communication, e.g., a Response that the proposed solution does not involve or contain the specific component related to the Request; 5) gathering each Response and aggregating them, checking information for impact, geography, team, product, release, version etc., and action/timing to address the issue; and 6) summarizing and sending back a final response to the Sender of the security incident alert.

In a simplistic use case, a sender may determine that an old version of a particular word processor has a potential security flaw, and that a patch should be applied for computers running this old version. An email may be sent to the Security Rep along with a patch file and instructions for installing the patch. The Security Rep forwards the email along to various managers in the organization who then each forward the message on to their subordinates with instructions that they should apply the patch and communicate back to the manager whether the patch was applied or not, and if not, provide a reasons for not applying it (e.g., a newer version of the word processor is installed on their system, etc.). Once the manager has received the feedback from his subordinates, the aggregates the responses and reports back to either the Security Rep or the sender. The sequence of actions above may easily become complex since modern systems may be made of several components that may be impacted, and it may be difficult and time consuming to ensure that all necessary actions have been taken by everyone.

A system and method described herein provide a technical solution of increasing the effectiveness and efficiency to the technical problem of managing multiple responses to a request by using an automated aggregator that is instantiated based on information within the message or metadata associated with it. The aggregator may be a grouping object that: implements policies (rules, instructions, and the like) for grouping received answers, and sends back the answers to the sender in an aggregated form. The aggregator may utilize natural language processing and machine learning to: determine a final impact for the solution; predict a final status and changes over time; and summarize final response for the whole solution.

Figures 4A, 4B:
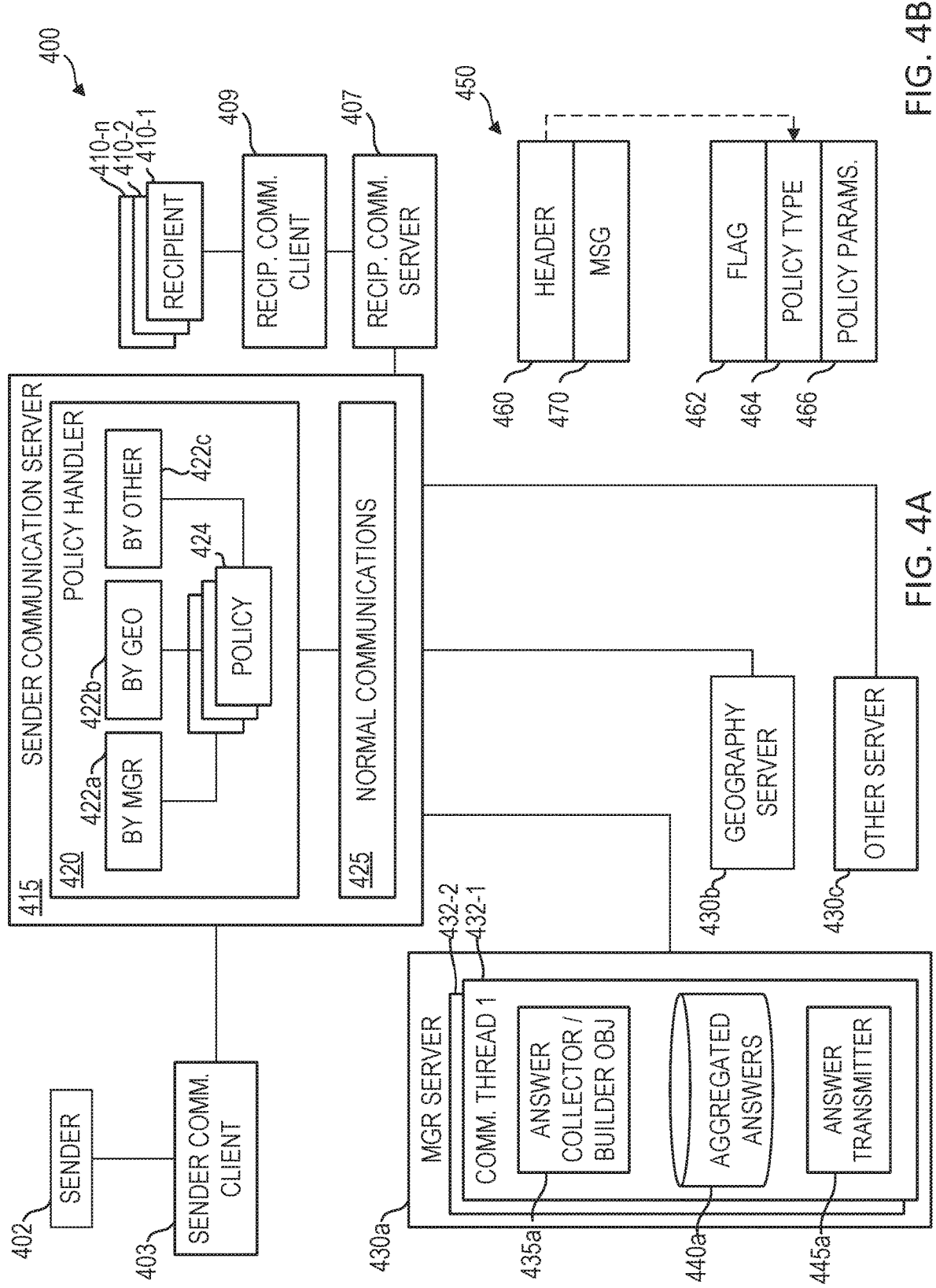
FIG. 4A is a block diagram illustrating a system for aggregating responses, according to some embodiments.
FIG. 4B is a block diagram illustrating a message format, according to some embodiments.

FIG. 4A is a block diagram that illustrates some example embodiments of a system 400. The system 400 includes a sender 402 who sends requests (also called "request messages") and receives aggregated responses to them. A request is a special type of message (see FIG. 4B 450) having an aggregation indicator (e.g., a tag or parameter value) within the message or in metadata associated with the message indicating that it is of this special type. In some embodiments, the request may be in the form of an email—when so, optional fields in headers, such as those described in the Internet Message Format Network Working Group RFC 2822, published April 2001 (available at https://www.ietf.org/rfc/rfc2822.txt), may be utilized to indicate, via, e.g., a flag, that the request is this special type of message and may be treated as described herein. This request may be directed at a plurality of recipients 410-1, 410-2 . . . 410-n, (collectively or representatively 410). Receipt of the message by the recipients 410 may be via a recipient communications server 407, such as an email server, and a recipient communication client 409, such as an email client.

This request (alternately, message) may contain information that may be of use to the recipients 410 to address an issue, such as the patch and installation instructions described in the use case above. In some embodiments, the sender 402 is the one who may set the flag indicating that this is the special type of message and that aggregation should be employed for receiving responses. This may be done, for example, by the sender 402 interacting with a control element on a user interface of an application on their sending device. By way of example, the sender's communication client 403 (or server 415) may have a selection element, such as a button, checkbox, or the like that the sender 402 can select to direct the email client to set the flag. Although the request message described in detail in the user case herein relates to security and/or computer/network issues, the applicability of this concept extends to any area in which a request is sent to a plurality of recipients and responses to the request are expected. In some embodiments, the selection element is presented to the user when a predefined number of recipients are named in the communication (see process 600, discussed below).

The message may be sent to a communication server 415, which may be run on a device associated with the sender 402, such as a DPS 100 or a server associated with the sender's Internet Service Provider, such as a mail server. The communication server 415 may comprise at least two parts: a policy handler 420, and a normal communications handler 425. Although these parts are shown as both being run within the communication server 415, their functionality may be split across multiple hardware devices. If the message does not have the flag set that indicates it should be handled as a special message, then the message may be routed to the normal communications handler 425, such as a traditional mail server, and be distributed in a conventional manner. However, if the message has the flag set, then it may be initially intercepted by the policy handler 420 prior to being set to the normal communications handler 425.

The policy handler 420 may have access to policy information 424 that allows it to work with the relationships between recipients 410 and aggregating entities 430. This policy information 424 may be located in a database that with or is separate from the sender communication server 415 and policy handler 420. The policy handler 420 may utilize the relationship knowledge to modify "reply-to" addresses identifying the respective message aggregation server 430 that is to be used for the recipient 410 response.

In some embodiments described herein, the policy handler may communicate with the message aggregation server(s) 430 to instantiate the communications thread 432 containing the answer collector/builder object 435 at the time it utilizes its relationship knowledge to modify the "reply-to" address. In other embodiments described herein, the instantiation of the communications thread 432 containing the answer collector/builder object 435 may be instantiated by the recipient's communication client 409 or server 407 in response to a communication sent to the relevant message aggregation server 430. This may be in the form of a dedicated instantiation message that identifies relevant information related to the communication thread 432, or it may be in response to a first responsive communication sent to the message aggregation server 430. In either case, such emails (i.e., the dedicated instantiation message or the messages to be aggregated) are not actually sent through to the recipients, but rather are used for the purpose of initiating aggregation and aggregating the recipient responses.

The policy handler 420, upon intercepting the flagged communication, may determine an aggregation policy to be applied. The aggregation policy may be set by the sender in a manner similar to that used to set the flag, and included along with the special handling flag described above, it may be set based on some predefined criteria, or set based on rules using or related to message content. In some embodiments, the aggregation policy may include the following types: aggregation by team/manager, aggregation by geographic region, aggregation by time zone (a special case of aggregation by geographic region), or aggregation by some other attribute. The policy handler 420 may thus be broken down into the following sub-handlers: by manager (team) 422a, by geography (including time zone) 422b, or by other attribute 422c. The geography may be defined by one or more bounded geographical regions or areas that do not have to be contiguous. The message metadata, in addition to including the flag and policy type, may further include policy parameters, which may differ by type, and/or by communication content, and may be set by the sender 402 or stored with predefined policies in the policy information 424 within the policy handler 420. Policy information 424 may further comprise information that relates individual recipients 410 to particular managers, geographic regions, time zones, and/or other organizational elements.

FIG. 4A further illustrates servers (430a, 430b, and 430c, or collectively/or representatively a "message aggregation server" 430) that may be used to handle the different policy types. The message aggregation server 430 may be any type of DPS 100, including a network element. The policy type indicator may thus dictate a message aggregation server address that is to be used by the recipient user when responding, and, for example, may be provided in the reply-to address prior to the message being sent to the user. When the policy type is determined by the policy handler 420 to be by manager 422a, a manager (or team) server 430a may be utilized. Similarly, when the policy type is determined by the policy handler 420 to be by geography 422b, a geography server 430b may be utilized. A policy type of time zone may be utilized as well, and this may be handled as a special case of geography in which the time zones comprise specific bounded geographical regions. Other attributes for aggregation may be used as well, as illustrated by the policy type being other 422c and utilizing another server 430c.

FIG. 4B is a block diagram of a special message 450 according to some embodiments, and is broken down into a message header 460 containing the message metadata described herein, and the message payload 470. The header 460 may contain, according to some embodiments, the flag 462, the policy type 464, and the policy parameters 466. The policy parameters 466 may include variables such as an aggregation count, i.e., how many responsive messages in a thread must be collected before being combined and returned to the sender 402. A flag 462 does not necessarily have to be a separate data entity, and may be complemented, e.g., by a policy type 464 indicating "none" when no aggregation system is to be used.

Returning to FIG. 4A, use of the manager server 430a is described below. Use of the geography server 430b and other server(s) 430c are not expressly described, but are structured and function similarly to the manager server 430a. The manager server 430a may have an aggregation object instantiated for a particular communication thread, such as communication thread 1 432-1. Communication thread 1 432-1 may be determined based on an attribute(s) of the message 450, such as a subject line of an email, sender, receiver, and/or date and time. All messages 450 meeting a particular thread criteria may be associated with that particular communication thread 432-1.

The aggregation object (e.g., the communication thread 1 432-1) may be instantiated upon (triggered by) receipt of the tagged message from the sender by the policy handler 420, or it may be instantiated upon (triggered by) receipt of the first reply to the tagged message from the recipient 410. In the latter case, it may not be necessary for the communication server 415 to interact directly with the manager (or other) server 430a upon receipt of the message 450 from the sender 402—all that the policy handler 420 needs to do in this instance is to forward the message 450 on to the user, but to provide a reply-to address so that the user response will get to the appropriate message aggregation server 430, which may be done by replacing an email reply address directed to a mail server on the message aggregation server. In this latter case, information about the policy, thread, recipients, etc. may need to be communicated to the message aggregation server 430 in some manner. In the former case, the policy handler 420 may communicate this information about the policy, thread, recipients, etc. to the message aggregation server 430. A new aggregation object (e.g., communication thread 2 432-2) may be created for each separate communication thread. In the following a single aggregation object as a communication thread (generically 432) is discussed. Although different servers 430a, 430b, and 430c are described above, this distinction is functional only, and all of these servers may be run on a same machine or server platform The communication thread 432 may comprise an answer collector/builder object 435a. In some embodiments, this object 435a may collect responses received from recipients 410 associated with a particular manager until a threshold number is reached, which may be specified in the policy parameters 466. When the threshold is reached, the aggregated responses may be combined, and a combined or aggregated response may be reported back to the sender 402. In other embodiments, each response is aggregated upon receipt, but the aggregated response is not sent until the threshold number is reached. The responses or "in-work" aggregation may be stored in an aggregated answers 440a of the communication thread 432, and an answer transmitter 445a may be used to transmit the aggregated response/answer back to the sender 402. The communication thread 432 should know how many total answers it is expecting based on the number of users the original request was sent to. In some embodiments, the aggregated response is not sent to the sender 402 until all or some predefined portion of expected responses are received.

Using the above-defined use case, the sender sends the word processor patch request to the twenty members of a management team under manager A (or any manager). The aggregator object/communication thread 1 432-1 may be created either when the patch request message is sent out by the communication client 415 or when the first response to the request is received. A threshold is set that the management server should aggregate answers in groups of ten. Thus, when the first ten responses are received, the answer collector object 435a may be invoked. It may parse the responses, using, e.g., NLP, and determine that eight of the users installed the patch, and two of the users did not, since they were not running a software version requiring the patch. The answer collector object 435a thus summarizes/aggregates these ten messages into a single summarizing message and returns it to the sender 402 using the answer transmitter 445a. The process is repeated for the final batch of ten responses received.

The policy handler 420 may have detailed information about managers and their respective teams as well as geographic areas, including time zones. In order to ensure that the aggregation policies are implemented, when so designated by the sender 402, the policy manager 420 may alter a "reply-to" field of the message so that it points to the manager server 430a or geographic server 430b. Thus, when the recipient 410 replies to the message, the response is directed to the appropriate server 430 for aggregation, instead of back to the sender 402 directly.

Figure 5:
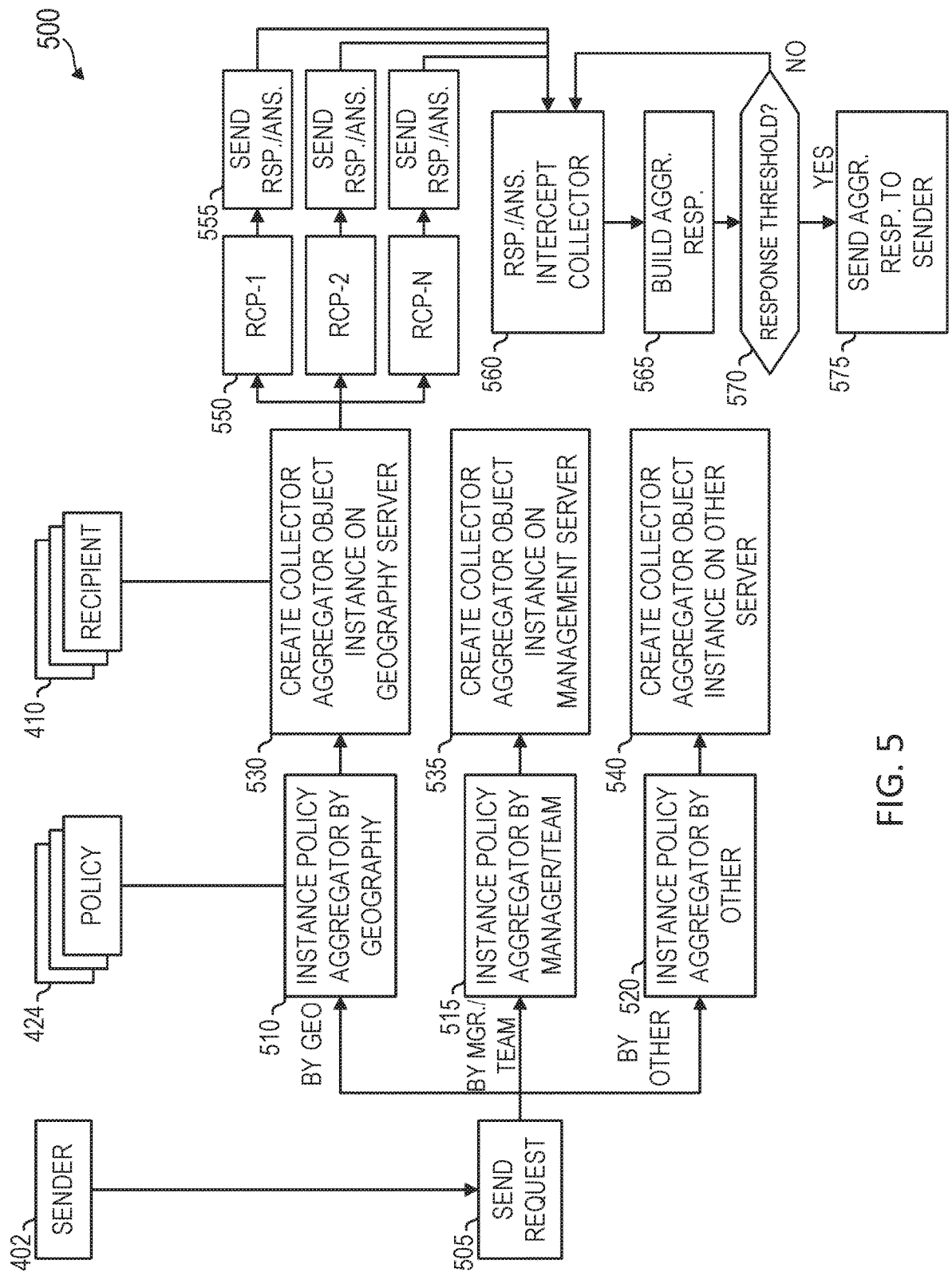
FIG. 5 is a flow chart illustrating a process for aggregating responses, according to some embodiments.

FIG. 5 is a flowchart illustrating an example process 500, according to some embodiments, by which the system 400 may operate. As noted above, the sender 402 may, at operation 505 send a request in a form of a message 450, such as an email, that has been tagged 462 for an aggregated response. The request message 450 may comprise an indicator as to the policy type 464, and may further comprise policy parameters or attributes 466. The policy handler 420 may instantiate the policy and create the collector aggregator object dependent on the policy type. When the policy type 464 is by geography 422b, in operation 510, an instance of the policy aggregator/collector object may be created, in operation 530, on the geography server 430b. When the policy type 464 is by manager/team 422a, in operation 515, an instance of the policy aggregator/collector object may be created, in operation 535, on the manager server 430a. Finally, when the policy type 464 is some other type 422c, in operation 520, an instance of the policy aggregator/collector object may be created, in operation 540, on the other server 430c.

The following operations of the process 500 are described, by way of example, for the by geography 422b policy type, but corresponding processes exist for the handling of other policy types as well. In operation 550, the request message 450 is received by the users (the received messages RCP-1, RCP-2, RCP-N corresponding to recipients 410-1, 410-2, 410-n, respectively). The recipients 410 may then send, in operation 555, their own respective responses/answers to be received, in operation 560, by the respective response or answer collector 435a. As discussed above, the response, in some embodiments, may be directed to an address placed into a reply-to field of an email message by the policy handler 420. In operation 565, the response/answer collector 435a may build an aggregated response (or may set the responses aside for future aggregation).

In operation 570, a test may be made to determine if a characteristic for all messages received and associated with the communication meets a message aggregation rule. For example, the characteristic for all messages received may be a received message count associated with the thread, and the message aggregation rule may be that the number of responses received meets some threshold value, e.g., one stored in the policy parameters 466. The message aggregation rule may be broad, however, and may include things like an expiration of a periodic timer, a communication received indicating that the message aggregation server 430 is to aggregate all of its currently accumulated responses, etc. If the response threshold has not been met (570: NO), then no aggregated response is sent back to the sender 402. Otherwise (570: YES), in operation 575, an aggregated response is sent back to the sender. In one embodiment, an aggregation threshold of less than the threshold amount may trigger the aggregation and subsequent sending of the aggregated response if certain criteria are met or according to an event. In some embodiments, if a total number of responses is expected, e.g., forty-three, and the aggregation threshold is set for ten, then aggregations for four full sets of ten may be created, along with an aggregation for the last remaining three responses. In some embodiments, the sender 402 may sent out a request, in the form of, e.g., a message, requesting an override on the threshold and indicating that any responses, regardless of the accumulated number, should be promptly aggregated and the aggregated response returned to the sender 402.

The above description details the process 500 occurring in a single-tier hierarchy. However, this process 500 may be easily extended to multi-tier hierarchies, e.g., in a recursive manner. To achieve this, each communication server 415 may evaluate if the next routing/splitting is done based on the specified (in the by geography policy type) geography. Routing is usually network based, so, for example, an email server pluggable component, such as the policy handler 420, may be provided to detect if the policy type 464 is set or if the flag 462 is set and if routing/splitting is occurring based on geographies, and, if so, a collector for the communication thread 432 may be instantiated. The server may be consequently added to available email headers. When the email arrives to the recipient, on the last server, the reply-to field may be set to the first server added in the list and a special collector message may be sent to it to provide the number of users the answer/response is supposed to arrive for that geographical area. Thus, when multiple tiers exist, the message aggregation server 430 may send the aggregated response directly or indirectly (e.g., via a higher-level message aggregation server) back to the sender 402.

For example, the recipient 410 described above may belong to a geographic region with multiple users below. In this way, an aggregator at one level above the bottom-most recipient 410 may aggregate ten user responses before reporting to a next higher level, and the next higher level may aggregate ten aggregated responses (for a total of one hundred user responses) before reporting to a next higher level, and so on. In this way, control of the aggregation may be extended across a multi-tier hierarchy. In this approach, the policy types across tiers may all be the same, or may differ from one another. The tiering information may be contained within the header 460 of the message 450.

Once the expected number of responses to a request are received, which may be known based on the number of recipients targeted in the communication, the aggregator object, such as the communications thread 432, may be terminated. The termination may be triggered by any activity associated with receipt of the last of the expected number of responses.

Figure 6:
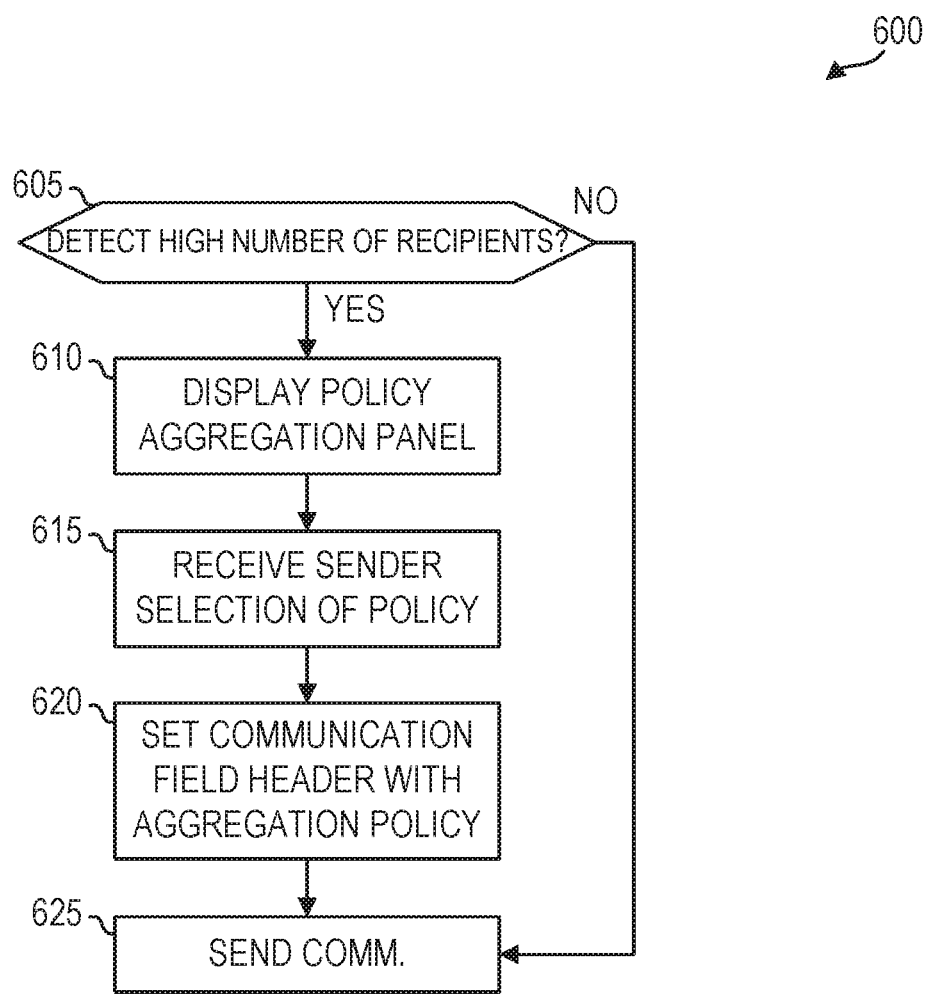
FIG. 6 is a flowchart illustrating a process for setting an aggregation policy, according to some embodiments.

FIG. 6 is a flowchart illustrating an example process 600 according to some embodiments of setting an aggregation policy at submission time that may be implemented by the sender's device. At operation 605, at a time prior to sending the communications, such as an email, in some embodiments, a determination may be made as to how many recipients are to be reached—communication aliases may be resolved in order to get an accurate count of recipients. If the number of recipients is considered low (605: N), based on a predefined threshold (e.g., one-hundred or less), then the communication may be sent in operation 625. Otherwise, (605: Y), in operation 610, an aggregation policy input element, such as a display panel or other user interface element, may be presented to the sender to allow the sender to select the aggregation policy. In operation 615, the sender's device may receive an aggregation policy value representing the sender selection of the aggregation policy, such as "by manager", "by geography", "by time zone", or some other aggregation policy. In operation 620, the aggregation policy value may be provided to metadata associated with the communication, such as, in some embodiments, an optional field in the email headers, for example, those identified by a known Internet message format specification.

FIG. 7 is a flowchart illustrating an example process 700, according to some embodiments, of a manager policy aggregation flow (when the aggregation policy has been selected by the sender as "by manager"). In some implementations, the instantiation of the communications thread 432 answer collector/builder object 435a may be instantiated by the hidden communication that contains the necessary information to instantiate the builder object 435a. In operation 705, the communication previously marked with the manager aggregation policy value reaches each recipient 410. In operation 710, it may be determined whether the aggregation policy value in the communication metadata is "by manager", i.e., the communication client 409 checks the communications metadata value to see if the manager aggregation policy value is present. If not (710: N), the reply-to field may be left blank, and the process 700 ends. If the aggregation policy value is "by manager" (710: Y), then in operation 715, the client communication server 407 may send to the recipient's manager server 430a a hidden (alternately, "fake") communication that will never reach the manager (the person) itself, but that is utilized as a part of the aggregation process. This hidden message may be tagged as such via, e.g., a communication header, subject line, or other metadata associated with the communication that is recognizable by the receiving communication server as being such.

In operation 720, a check is made to see if this hidden communication is the first that is related to this thread. If so (720: Y), a collector object is instantiated on the manager's server and the sender communication is stored, with the process continuing at operation 730. If not (720: N), i.e., the hidden communication is not the first that is related to this thread, a collector object counter is incremented, which serves the purpose of letting the specific collector know how many responses it is supposed to receive in total for that thread, and the process continues at operation 730. On the recipient side, each communication replying to that thread may have the reply-to field set to the manager's communication address so that responses are directed to be sent to the manager. In some implementations, the hidden communications may be separate from the actual responses from the recipient 410—in other implementations, these may be one and the same. In some implementations, if the policy handler 420 has adequate information about the appropriate manager server(s) 430a, it may instantiate the communication thread 432 and its answer collector/builder object 435.

FIG. 8 is a flowchart illustrating operation of the manager policy aggregation flow process 800 on the manager's server. In this process 800, in operation 805, the defined collectors inspect the received emails while they flow and identify the thread and assigned collectors. These received emails are not forwarded to the manager. In operation 810, a determination is made as to whether the reply communications meet some predefined threshold, such as 75% of the expected emails. If this predefined threshold is not met (810: N), then the process 800 ends. Otherwise (810: Y), an aggregated response is formulated and sent to the initial sender. Information required from the processing, such as specifying the aggregation policy, marking an email as hidden, conveying the sender to the collector, stopping sending of the response to be aggregated to the manager may be controlled through specific metadata values, such as values in optional field headers.

Figure 9:
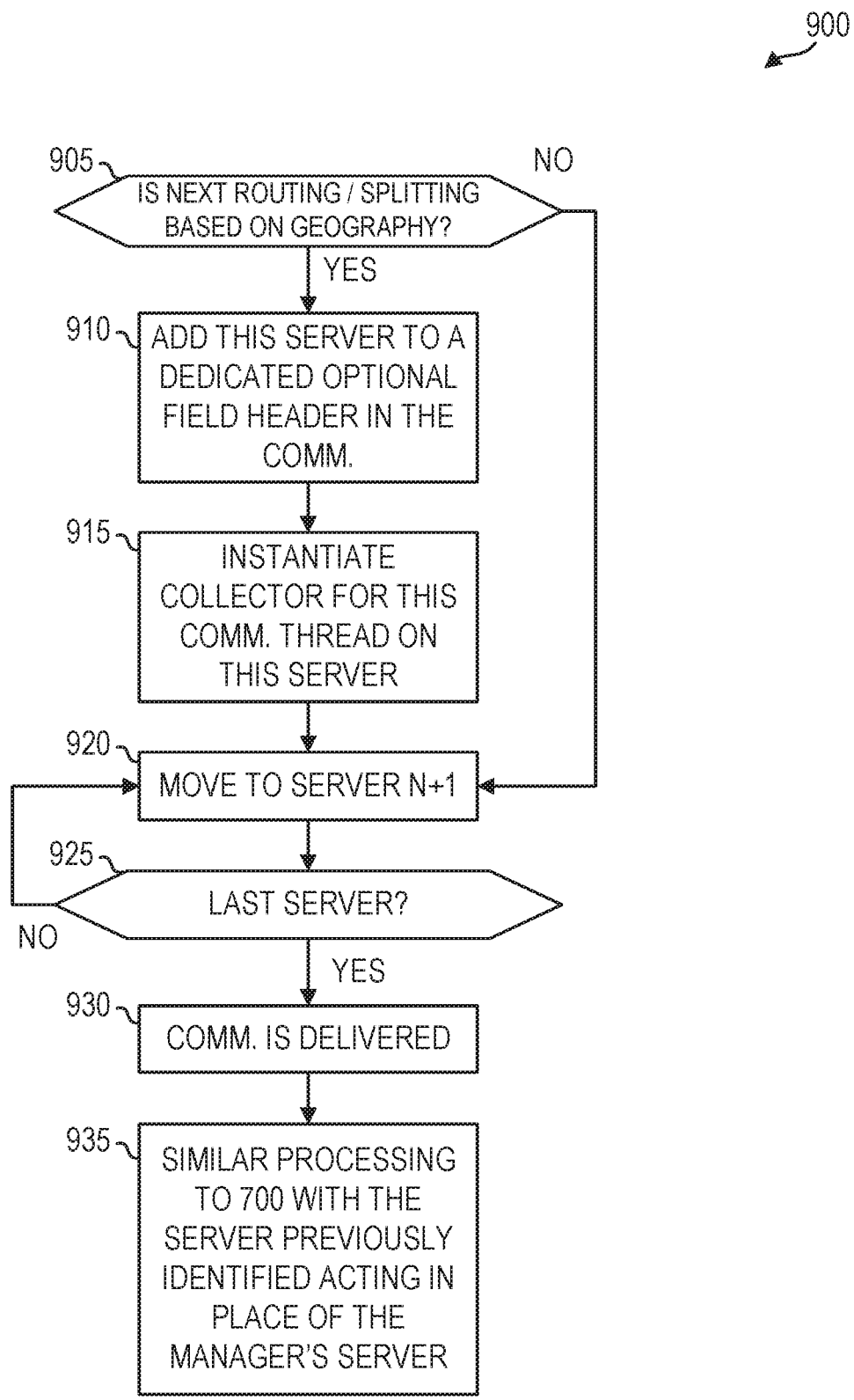
FIG. 9 is a flowchart illustrating a process for a geographic aggregation policy.

FIG. 9 is a flowchart illustrating a process 900, according to some embodiments, of a geographic aggregation policy flow (when the aggregation policy has been selected by the sender as "by geography"). In some embodiments, the instantiation of the communications thread 432 answer collector/builder object (corresponding to 435a (i.e., "(b)") not shown in the drawing)) may be instantiated by the policy handler 420 that contains the necessary information to instantiate the builder object on the geography server 430b. Thus, instantiation of the answer collector/builder object may take place based on activities on the sender communication server 415, or in the policy handler 420, as opposed to on the recipient's communication server 407 or client 409, as may be done with the "by manager" policy.

In operation 905, when the communication that has been previously marked with the geographic aggregation policy reaches each sender communication server 415 (or other downstream communication server), it may be evaluated to determine if the next routing or splitting of the communication is geographically based. If so (905: Y), then, in operation 910, this evaluating server may be added as metadata to the communication, e.g., in some embodiments, in a dedicated option field header in an email, and, in operation 915, an aggregation collector may be instantiated for this thread, with execution continuing at operation 920. In operation 920, the communication flows to the next server. In operation 925, if this is not the last server (925: N), then operation 920 is repeated—otherwise (925: Y), in operation 930, the communication may be delivered. At the recipient side, in operation 935, a processing similar to process 700 may be performed, but this time the server for which the collector is instantiated is the one previously identified. The difference may thus be when the collector is initiated, i.e., by the sender communication server 415 or one of the downstream branch sender communication servers. Process 800 may also apply to this server. The time zone policy aggregation may be based on the same principles as the geographic area aggregation, since a time zone may readily be translated into geographical areas.

The roles of sender 402 and recipient 410 along with their respective communication clients 403, 409 and communication servers 415, 407 are not fixed, and may be reversed. In other words, a recipient 410 of one communication thread may be a sender 402 in another. In this way, any entity may be both a sender and receiver, possibly simultaneously, with different communication threads in order to maximize flexibility in utilizing aggregated communications.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for aggregating electronic response messages, the method comprising:
   using a processor of a sender communication server, receiving a request message from a sender addressed to a plurality of users, the request message containing within the request message an original-sender-provided explicit subsequent message aggregation indicator (SMAI) indicating that subsequent plural responses to the request message are to be aggregated and combined into a single aggregated response;
   using the processor, modifying a recipient response address within the request message directing response messages from the plurality of users to go to a message aggregation server that is separate from the sender communication server, thereby producing modified messages;
   sending the modified messages to the plurality of users;
   using the message aggregation server:
      instantiating a message aggregator;
      receiving a response message associated with a communication thread;
      determining that a characteristic for all messages received and associated with the communication thread meets a message sender-specified aggregation rule; and
      based on the characteristic meeting the sender-specified aggregation rule, creating and sending an aggregated response directly or indirectly to the sender;
      wherein the aggregated response is created:
         by parsing contents of all messages received and summarizing them according to the sender-specified aggregation rule; and
         after the sender has specified the sender-specified aggregation rule.

2. The method of claim 1, wherein the request message is an email message and the SMAI is a predefined field in a header of the email.

3. The method of claim 1, wherein:
the request message received from the sender comprises a policy type indicator selected from the group consisting of a first policy type indicator and a second policy type indicator;
responsive to the policy type indicator being the first policy type indicator, providing an address of a first message aggregation server as the recipient response address; and
responsive to the policy type indicator being the second policy type indicator, providing an address of a second message aggregation server as the recipient response address.

4. The method of claim 3, wherein:
the first policy type indicator is a by manager policy type, and the first message aggregation server is a manager aggregation server; and
the second policy type indicator is a by geography policy type, and the second message aggregation server is a geography aggregation server.

5. The method of claim 1, further comprising sending policy, thread, and recipient information to the message aggregation server that is indicated by a policy type indicator within the received message.

6. The method of claim 1, wherein the request message comprises data related to actions to address a computer or network issue.

7. The method of claim 1, further comprising using policy data to associate the users with a criteria selected from the group consisting of their managers and their geographic areas.

8. The method of claim 1, wherein the instantiating is triggered by receipt of a communication related to the communication thread received by the message aggregation server from an entity selected from the group consisting of: the sender communication server and the recipient communication server.

9. The method of claim 1, further comprising determining the communication thread based on an element selected from the group consisting of a message subject, sender, receiver, date, and time.

10. The method of claim 1, wherein the characteristic is a message count and message aggregation rule is the message count exceeding a threshold number of messages.

11. The method of claim 1, wherein the message aggregator instantiation is terminated triggered by a last expected message in the communication thread being received.

12. The method of claim 1, wherein the parsing of the contents utilizes natural language processing.

13. The method of claim 1, further comprising:
using a processor of a sender device:
receiving a user indication that a request message is to receive aggregated replies;
setting the SMAI within the request message; and
sending the request message to the communication server.

14. The method of claim 1, wherein the sender-specified aggregation rule is contained within the request message.

15. A system, comprising:
communication server comprising a processor configured to:
receive a request message from a sender addressed to a plurality of users, the request message containing within the request message an original-sender-provided explicit subsequent message aggregation indicator (SMAI) indicating that subsequent plural responses to the request message are to be aggregated and combined into a single aggregated response;
modify a recipient response address within the request message directing response messages from the plurality of users to go to a message aggregation server that is separate from the sender communication server, thereby producing modified messages; and
send the modified messages to the plurality of users; and
a message aggregation server comprising a processor configured to:
instantiate a message aggregator;
receive a response message associated with a communication thread;
determine that a characteristic for all messages received and associated with the communication thread meets a message sender-specified aggregation rule; and
based on the characteristic meeting the sender-specified aggregation rule, create and send an aggregated response directly or indirectly to the sender;
wherein the aggregated response is created:
by parsing contents of all messages received and summarizing them according to the sender-specified aggregation rule; and
after the sender has specified the sender-specified aggregation rule.

16. The system according to claim 15, wherein:
the request message received from the sender comprises a policy type indicator selected from the group consisting of a first policy type indicator and a second policy type indicator;
the processor is further configured to:
responsive to the policy type indicator being the first policy type indicator, provide an address of a first message aggregation server as the recipient response address; and
responsive to the policy type indicator being the second policy type indicator, provide an address of a second message aggregation server as the recipient response address.

17. The system according to claim 16, wherein:
the first policy type indicator is a by manager policy type, and the first message aggregation server is a manager aggregation server; and
the second policy type indicator is a by geography policy type, and the second message aggregation server is a geography aggregation server.

18. A computer program product for combining search indexes of a search service, the computer program product comprising a computer readable storage medium having computer-readable program code embodied therewith to:
when executed on a sender communication server processor:
receive a request message from a sender addressed to a plurality of users, the request message containing within the request message an original-sender-provided explicit subsequent message aggregation indicator (SMAI) indicating that subsequent plural responses to the request message are to be aggregated and combined into a single aggregated response;
modify a recipient response address within the request message directing response messages from the plurality of users to go to a message aggregation server that is separate from the sender communication server, thereby producing modified messages; and send the modified messages to the plurality of users; and when executed on a message aggregation server processor:

instantiate a message aggregator;

receive a response message associated with a communication thread;

determine that a characteristic for all messages received and associated with the communication thread meets a message sender-specified aggregation rule; and based on the characteristic meeting the sender-specified aggregation rule, create and send an aggregated response directly or indirectly to the sender;

wherein the aggregated response is created:

by parsing contents of all messages received and summarizing them according to the sender-specified aggregation rule; and after the sender has specified the sender-specified aggregation rule.

19. The computer program product of claim 18, wherein:

the request message received from the sender comprises a policy type indicator selected from the group consisting of a first policy type indicator and a second policy type indicator; and the computer-readable program code stored on the computer-readable storage medium is further configured to, when executed on a processor:

responsive to the policy type indicator being the first policy type indicator, provide an address of a first message aggregation server as the recipient response address; and responsive to the policy type indicator being the second policy type indicator, provide an address of a second message aggregation server as the recipient response address.

* * * * *